United States Patent [19]

Patel

[11] 4,262,214
[45] Apr. 14, 1981

[54] SYSTEM FOR SWITCHING A LOAD BETWEEN TWO SOURCES

[75] Inventor: Haresh C. Patel, Franklin, Mass.

[73] Assignee: The Foxboro Company, Foxboro, Mass.

[21] Appl. No.: 82,829

[22] Filed: Oct. 9, 1979

[51] Int. Cl.³ ............................................... H02J 9/06
[52] U.S. Cl. ........................................ 307/51; 307/70; 361/6; 361/92
[58] Field of Search .................. 307/70, 51, 85, 86, 307/64, 65, 66, 67, 68; 361/92, 3, 6

[56] References Cited

U.S. PATENT DOCUMENTS

| 2,221,604 | 11/1940 | Peterson et al. | 307/64 |
| 3,638,040 | 1/1972 | Mahmoud | 307/85 X |
| 3,808,451 | 4/1974 | Pittet | 307/64 |
| 4,189,649 | 2/1980 | Przywozny et al. | 307/64 |

Primary Examiner—L. T. Hix
Assistant Examiner—James L. Dwyer
Attorney, Agent, or Firm—Lawrence J. Dion, Jr.; Andrew T. Karnakis

[57] ABSTRACT

A system is disclosed for switching a load between two ac sources wherein no degree of synchronization therebetween is required and wherein the switching is accomplished with the use of two electro-mechanical relays each having a three pole, double throw contact arrangement. Furthermore, this load switching is accomplished without the production of any interpower currents between the two sources.

5 Claims, 5 Drawing Figures

SYSTEM FOR SWITCHING A LOAD BETWEEN TWO SOURCES

FIELD OF THE INVENTION

This invention generally relates to switching of loads from one power source to another. More particularly, this invention relates to switching of loads to one ac power source from another where the power sources are not necessarily both of the same frequency and the same phase.

BACKGROUND OF THE INVENTION

Methods of switching a load between alternate ac sources have been proposed and tried.

One such attempt to switch a load between alternate sources involved the use of a single electro-mechanical relay to do the source switching. For inductive loads during switching, such single relay systems will, upon movement of the relay armature, produce an arc between the contact on the armature and the particular power source attempted to be disconnected. If sufficient time has not expired when the armature contact engages the other power source, the arc will not become extinguished. Thusly, if the two power sources are not both of the same frequency and the same phase, they will be connected in a serial manner for a sufficient period of time to allow large interpower currents to be produced which undesirably results in the circuit breakers for the respective sources tripping out. Alternatively, producing a slow enough armature travel time to ensure the arc will be extinguished when the armature contact engages the other power source requires a relay of rather large physical size when operating at normal ac power frequencies.

Another such load switching technique is found in U.S. Pat. No. 3,638,040 (Mahmoud) and involves the use of a pair of controlled power transistors to perform the switching. During the switching operation, both transistors are controlled in a manner so that as one transistor is turning off, the other is turning on. Consequently, sufficient series resistance is presented between the two sources during switching to limit to an acceptable value the interpower currents produced, thereby ensuring neither source's circuit breaker will trip. The method of Mahmoud, however, suffers from serious disadvantages. Firstly, the Mahmoud triggering circuitry for the two transistors is complex because Mahmoud must ensure that both transistors are never turned on at the same time. Secondly, the amount of power that can be transferred with the Mahmoud device is limited by the ratings of the switching transistors.

Notwithstanding the switching techniques discussed above, it is apparent the need exists for a less expensive, smaller and higher power device to perform these switching tasks.

SUMMARY OF THE INVENTION

In a preferred embodiment of the present invention to be described below, a system for switching an inductive load between two asynchronously related ac sources having the same frequency with the use of two electro-mechanical relays without producing any interpower currents is shown. Furthermore, this system contains a controller for controlling the operation of the two relays so that transfer from a primary source to an auxiliary source occurs when the primary source voltage falls below a threshold value and retransfer to the primary source occurs only when the primary source voltage exceeds this threshold value by a predetermined amount.

PREFERRED EMBODIMENT

Figure 1:
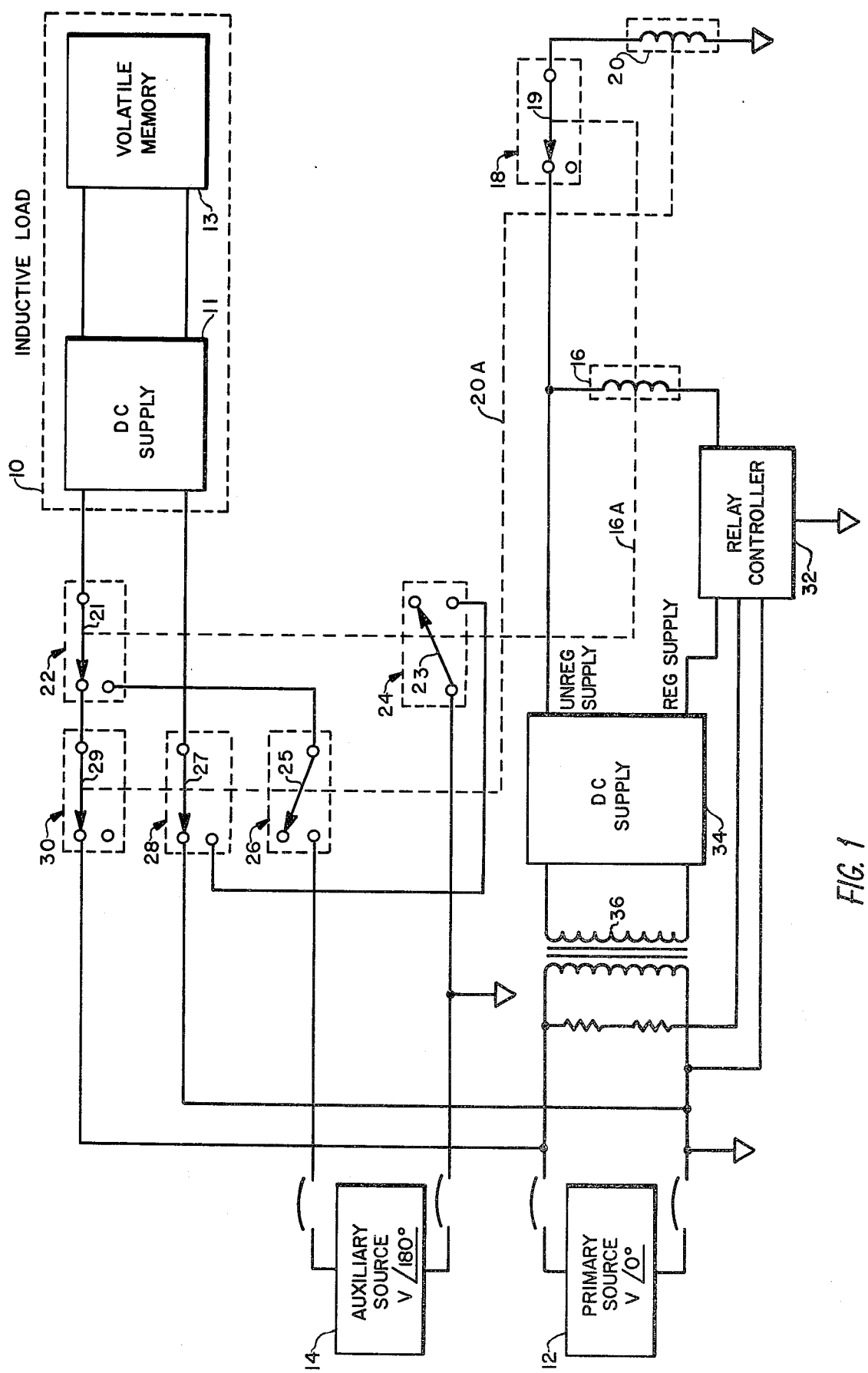
FIG. 1 shows a schematic/block diagram for switching a load between two asynchronously related independent power sources having the same frequency.

Referring now to FIG. 1, a system for automatically transferring and retransferring an inductive load 10 between two asynchronously relared ac sources having the same frequency, namely a primary source 12 and an auxiliary source 14, without producing any interpower currents is shown. The inductive load includes a dc supply 11 feeding a volatile memory 13. The switching system includes relay controller 32, dc relays 16 and 20 shown associated with their respective groups of contacts (18, 22, 24) and (26, 28, 30) by the dashed lines 16A and 20A, dc supply 34, and ac power transformer 36. The relays and their respective groups of contacts are shown in the energized state with the primary source shown connected to the load.

The automatic transfer from the primary source 12 to the auxiliary source 14 occurs in the following manner. If the peak magnitude of the voltage output of the primary source 12 drops below a first threshold value of 139 volts, the relay controller 32 will interrupt the current to the relay 16. This causes the armatures 19, 21, 23 of the contacts 18, 22, 24 to all begin to change state. When armature 21 starts to move, an arc is struck between itself and the hot side of the primary source 12. After the armature 21 has completed its state change, the hot side of the auxiliary source 14 will be fully prepared for connection to the load 10. Armature 23 of the contact 24 similarly changes state preparing the ground side of the auxiliary source 14 to be connected to the load. When armature 19 of the contact 18, which controls the operation of the relay 20, changes state the current to the relay 20 is interrupted, thereby initiating a state change of the contacts 26, 28 and 30, by the movement of their respective armatures 25, 27 and 29. As is apparent when armature 29 starts to move, an arc is struck between itself and the hot side of the primary source 12. After the armatures 25, 27 and 29 complete their state change, the auxiliary source will be completely connected to the load.

As discussed above, a pair of arcs are ignited during the disconnection and connection of the hot sides of the respective sources. Such arcs if uncontrolled as to duration and path can be troublesome. More particularly, if the switching time interval defined by the initial movement of the armature 21 and the complete connection of the hot side of the auxiliary source to the load by the armature 25 is less than one-half cycle of the ac sources, the arcs ignited by the armatures 21 and 29 will not be extinguished during this interval resulting in both sources being connected to the load at the same time. To prevent this simultaneous dual connection and the consequential production of interpower currents, the mechanical response time of the relay 16 and the total response time of the relay 20 (i.e, mechanical plus coil time constant) are chosen so that their sum total is greater than one-half cycle. Establishment of this criterion ensures the primary source 12 will undergo a polarity reversal during the aforementioned switching time interval, hence both arcs will be extinguished prior to the connection of the auxiliary source to the load.

Automatic retransfer from the auxiliary source 14 to the primary source 12, on the other hand, will occur if the peak magnitude of the voltage output of the primary source 12 rises above a second threshold value of 156 volts. The relay controller 32 will then initiate the sequencing of the relays 16 and 20 allowing the armatures 19, 21, 23, 25, 27 and 29 to return to their original state resulting in the primary source 12 being reconnected to the load 10. It will be appreciated that during retransfer to the primary, the sequence of contact closures is conducted in the same manner as discussed above so that simultaneous dual connection between the sources 12 and 14 is prevented and, consequently, no production of interpower currents occurs.

Use of a single threshold for both transfer and retransfer can produce severe hunting problems if the peak magnitude of the primary source 12 fluctuates about the threshold point. To eliminate this hunting problem, different thresholds for transfer (i.e., 139 volts) and retransfer (i.e., 156 volts) are established by the relay controller 32.

Figure 2:
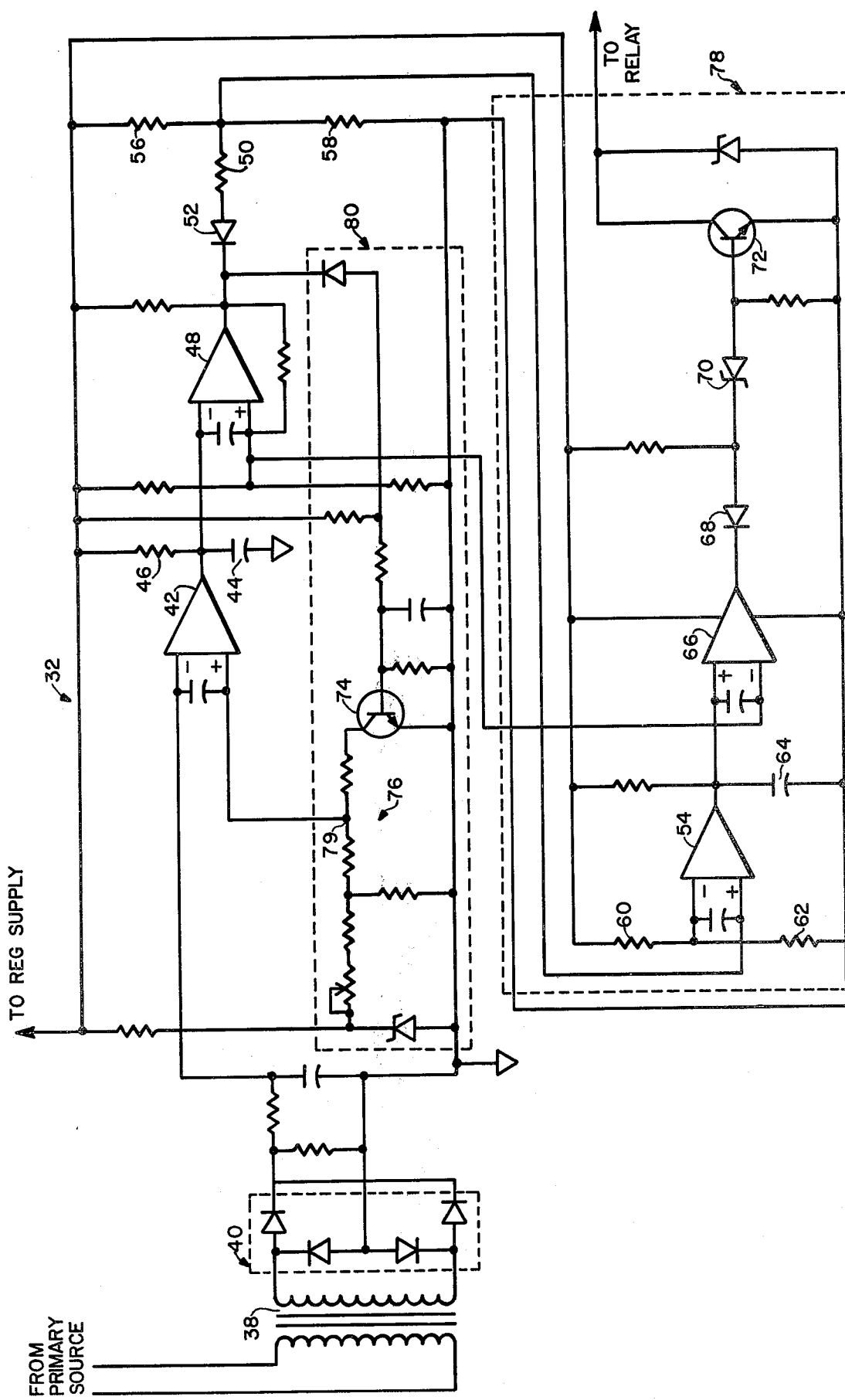
FIG. 2 shows more detailed features of the relay controller of FIG. 1.

Referring now to FIG. 2, the operation of the relay controller 32 is more particularly explained. A sensing transformer 38 is coupled to the primary source 12 for the purpose of sensing the magnitude of its voltage output. Coupled to the output of the sensing transformer is a full-wave bridge rectifier 40 for converting the sensed ac voltage to full-wave dc (see FIG. 3 also). The output of the bridge rectifier is then fed to the negative terminal of a first comparator 42.

The positive input to the comparator 42 sets the transfer and retransfer thresholds which are, in turn, dependent upon the state of a switching transistor 74 and values of a bi-state voltage divider 76. In the former case, the positive input to the comparator 42 is set at a value proportional to the peak magnitude of the output of the primary source 12 at which transfer is desired i.e., 139 volts. In the latter case, the positive input is set at a different and higher value proportional to the peak magnitude at which retransfer is desired, i.e., 156 volts.

Figure 3:
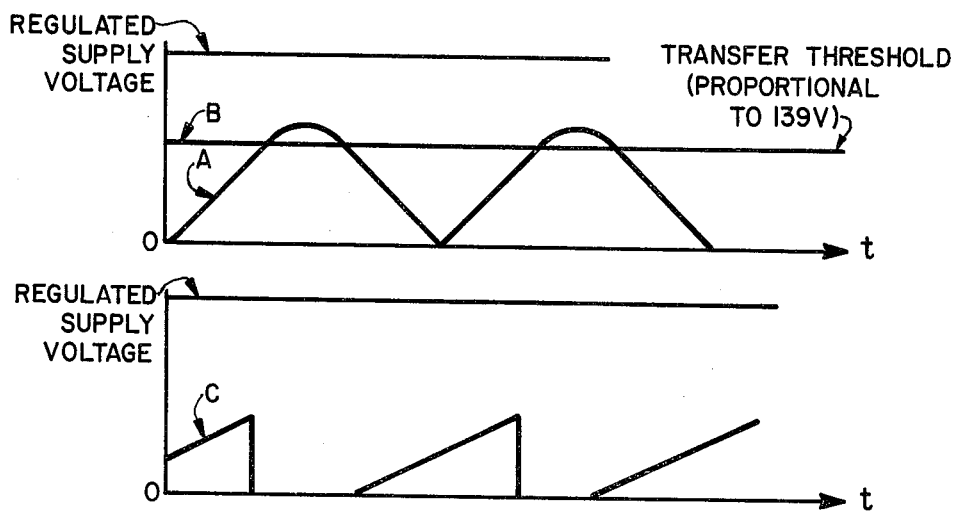
FIG. 3 shows wave forms appearing in the relay controller when the primary source is connected to the load.

Considering the former case in more detail, FIG. 3 shows the normal operation of the relay controller 32 when the primary source 12 is connected to the load 10 and the peak input voltage to the negative input of the comparator 42 is in excess of the transfer threshold. As shown, whenever the negative input to the comparator 42 (wave form A) is less than the positive input (threshold B), its output presents a high impedance which allows a capacitor 44 to charge through a resistor 46 (wave form C) towards the supply voltage. When the negative input exceeds the positive input, the output of the comparator presents a low impedance discharging the capacitor rapidly to ground.

This output saw-tooth signal (wave form C) is fed to the negative input of comparator 48. The peak value is set so that it will not exceed a bias present at the positive input to comparator 48 as long as the peak value of the negative input to the comparator 42 is greater than the positive input to the comparator 42, which, of course, is the case during normal system operations. Thusly, the output of the comparator 48 then presents a very high impedance causing no current to flow through resistor 50 or diode 52 which controls the output stage 78 of the relay controller.

The output of the comparator 48 is also part of a feedback network 80 which serves to control the bi-state voltage divider 76 through the operation of the switching transistor 74. When the output of the comparator 48 presents a high impedance, the transistor is in its saturation region and the positive input to comparator 42 is maintained at the transfer threshold value by output 79 of the coupled bi-state divider.

Now returning to the operation of the relay controller output stage 78, resistors 56, 58 and 60, 62 determine the respective voltages at the negative and positive inputs to comparator 54. These values are chosen to make the negative input at a lower potential than the positive input when the output of the comparator 48 presents a high impedance. Thusly, the output of the comparator 54 also presents a high impedance allowing capacitor 64 to charge to a sufficient voltage which exceeds a predetermined fixed bias at the negative input to comparator 66.

Hence, the output of the comparator 66 is of sufficiently high impedance to insure that little or no current flows through diode 68. The voltage supplied to Zener diode 70 under these conditions is large enough to exceed its breakdown voltage and supply a positive voltage to the base of a transistor 72. The transistor is maintained in its saturation region keeping the relay 16 activated. The contact 18 of relay 16 will then keep the relay 20 activated and thusly the primary source 12 is kept connected to the load 10.

Figure 4:
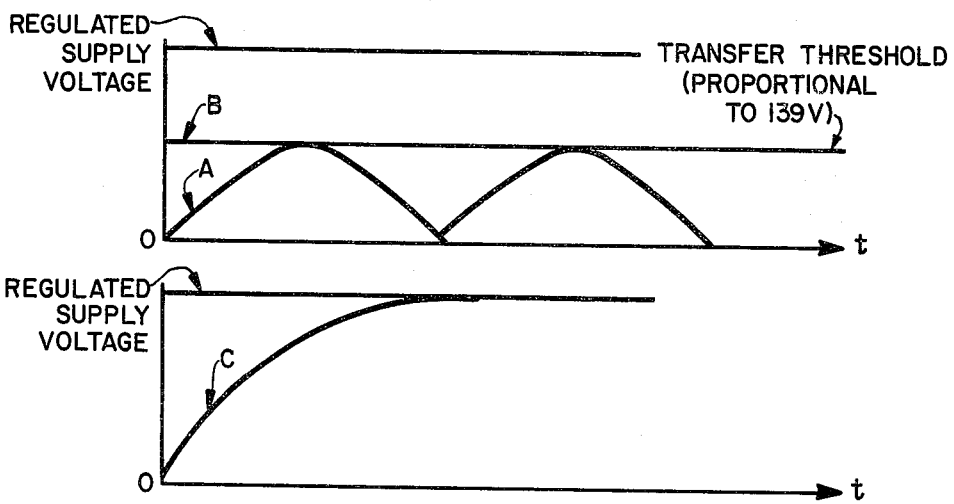
FIG. 4 shows wave forms appearing in the relay controller during the transfer of the load from the primary source to the auxiliary source.

Referring now to FIG. 4, the details of the operation of the relay controller will be discussed when the peak input voltage to the negative input of the comparator 42 (wave form A) is always less than the transfer threshold (threshold B). In this instance, the output of the comparator 42 presents a continual high impedance and the capacitor 44 is not allowed to charge and discharge in the saw-toothed manner discussed previously. Instead, the capacitor will charge to the supply voltage (wave form C). This will invert the output of the comparators 48, 54 and 66 respectively. The diode 68 will conduct and not allow the Zener diode 70 to exceed its breakdown voltage. Consequently, the transistor 72 will shut off causing the relay 16 to drop out. When the relay 16 drops out, the relay 20 will subsequently drop out thereafter. This causes the load 10 to be transferred from the primary source 12 to the auxiliary source 14 in the manner outlined above. Because the output of the comparator 48 now presents a low impedance, the transistor 74 will not have sufficient base voltage to remain on, and the output 79 of the bi-state voltage divider 76 will force the positive input to the comparator 42 to the retransfer threshold value (threshold B of FIG. 5).

Figure 5:
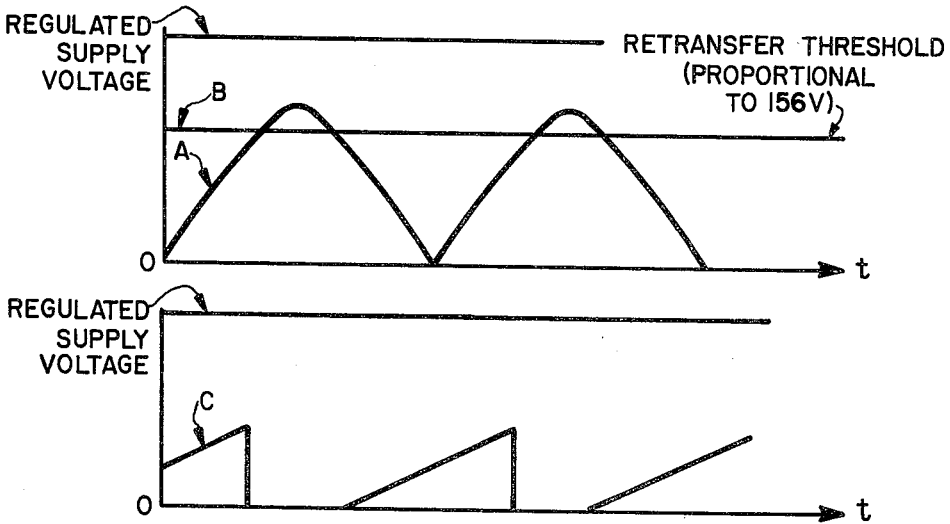
FIG. 5 shows wave forms appearing in the relay controller during the retransfer of the load from the auxiliary source to the primary source.

Referring now to the details of FIG. 5, when the peak input to the negative terminal of the comparator 42 exceeds the retransfer threshold, this input will exhibit a relationship to the comparator's positive input that is similar to their relationship in FIG. 3 and the saw-tooth output of the comparator 42 will be reestablished. Similarly, the relays 16 and 20 will sequentially energize retransferring the load 10 from the auxiliary source 14 to the primary source 12. It should also be noted that the output of the comparator 48 will revert to a high impedance thereby forcing the transistor 74 into saturation and returning the positive input to the comparator 42 to the transfer threshold value (threshold B of FIG. 3). In this manner, the relay controller has built therein an automatic hysteresis effect so that transfer from the primary to auxiliary will occur when the primary peak voltage drops below 139 volts, but retransfer will only occur when the primary rises above 156 volts thereby preventing cyclic operation of the relay switching mechanism.

Many changes and modifications in the above-described embodiment of the present invention may of course be carried out without departing from the scope thereof. Accordingly, that scope is intended to be limited only to the scope of the appended claims.

What is claimed is:

1. A switching system for bi-directional switching of a load between first and second independent, asynchronous a-c sources comprising:

first bi-state switching means;
second bi-state switching means in series with said first switching means and operable with said first switching means to connect said first source to said load when said first and second switch means are in one state;
third bi-state switching means;
fourth bi-state switching means in series with said third switching means and operable with said third switching means to connect said second source to said load when said third and fourth switching means are in one state;
fifth bi-state switching means;
a first bi-state actuator being coupled to said first, third and fifth switching means and being operable to control the state of said first, third and fifth switching means;
a second bi-state actuator being coupled to said second and fourth switching means and being operable in response to said fifth switching means to control the state of said second and fourth switching means;
sensor means responsive to first and second predetermined conditions of said first source and having an output for controlling the state of said first bi-state actuator and thereby controlling the state of said second bi-state actuator;
said predetermined conditions causing said actuators to sequentially change state;
said second actuator always completing its state change a predetermined period following the start of the state change of said first actuator when connecting either said first source or said second source to said load;
said predetermined period being of sufficient magnitude such that one of said sources is electically disconnected from said load before the other one is electrically connected to said load;
whereby during switching no interpower currents are produced.

2. System as claimed in claim 1 wherein said first predetermined condition is a voltage level of first magnitude;
said second predetermined condition is a voltage level of second magnitude;
said second magnitude being greater than said first magnitude.

3. System as claimed in claim 1 wherein said sources have the same frequency.

4. System as claimed in claim 3 wherein said predetermined period is greater than one-half cycle of the ac sources.

5. System as claimed in claim 4 wherein the frequency of the ac sources is 60 Hertz.

* * * * *